M. VOUGA.
PROCESS OF AND APPARATUS FOR MANUFACTURING DRIED FOOD PRODUCTS.
APPLICATION FILED JUNE 11, 1912.
1,054,650. Patented Feb. 25, 1913.
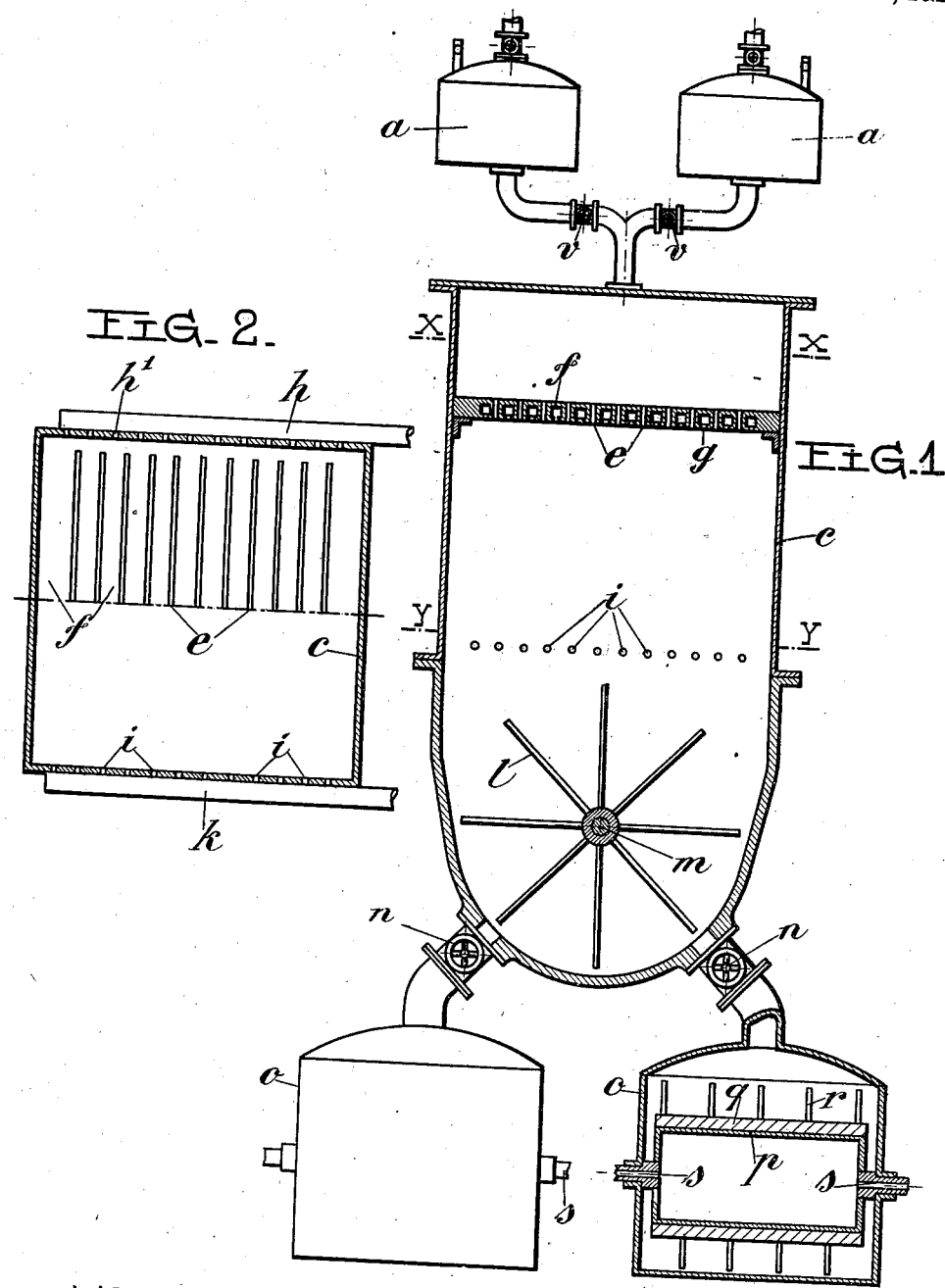

UNITED STATES PATENT OFFICE.

MAURICE VOUGA, OF NEUCHÂTEL, SWITZERLAND.

PROCESS OF AND APPARATUS FOR MANUFACTURING DRIED FOOD PRODUCTS.

1,054,650.

Specification of Letters Patent. Patented Feb. 25, 1913.

Application filed June 11, 1912. Serial No. 702,967.

*To all whom it may concern:*

Be it known that I, MAURICE VOUGA, a citizen of the Swiss Republic, residing at Cortaillod, Neuchâtel, Switzerland, have invented certain new and useful Improvements in Processes of and Apparatus for Manufacturing Dried Food Products, of which the following is a specification.

The present invention has for its object an improved process of and apparatus for manufacturing dried milk and the like from condensed milk and the like by currents of air.

The manufacture of dried milk from condensed milk according to the known processes and with the known apparatus presents among others, the disadvantages that the condensed milk is not uniformly treated, to the detriment of the taste and solubility of the product, and that the air is not economically utilized. The present invention overcomes these disadvantages and enables the production of a uniform product on a commercial scale.

The improved process consists in forcing the condensed milk to be treated through a grating, sieve, or equivalent means (hereinafter generally referred to as a "grating") so as to form the condensed milk into freely depending sheets, threads, tubes, or the like (hereinafter referred to as "sheets"), and directing currents of air at a suitable temperature from points next or adjacent to the point of formation or egress of each sheet from the grating so that each sheet is dried by being heated on both sides by air moving in the same direction as the sheet.

The improved apparatus for the manufacture of dried milk from condensed milk, which is particularly adapted for carrying out said process, comprises in combination, a chamber, a grating, sieve, or equivalent means, the spaces between the bars or the like of which serve for the condensed milk to be forced through to form it into depending sheets, means for directing currents of air at a suitable temperature from points next or adjacent to the issuing sheets and in the same direction as their direction of movement, means for forcing the condensed milk through the grating, and means for breaking up the desiccated sheets.

The accompanying drawings, represent, by way of example, diagrammatic representations, of one form of construction of said apparatus.

Figure 1 is a vertical section; Fig. 2 is a sectional plan, as to the upper half on $x$—$x$, Fig. 1, and as to the lower half on $y$—$y$, Fig. 1.

Referring to the drawing, $c$, represents the chamber, which is preferably rectangular in form, and is divided by the transverse grating, $f$, into upper and lower compartments, respectively for receiving the mass of condensed milk to be treated, and for the formed sheets of milk to depend descend and be dried within. The grating, $f$, is composed of hollow bars arranged so as to leave narrow vertical spaces or slots, $e$, for the condensed milk to pass through. Each bar, $f$, is provided with a slit or apertures, $g$, at its lower side opening downward parallel with the spaces, $e$, and the interior of each bar is in communication with a hot air main, $h$, by openings, $h'$. The bars might be solid instead of hollow and the heated air be conducted to between the sheets of milk by apertured pipes arranged beneath and parallel to the bars.

Any suitable means may be provided for regulating the temperature of the air according to the degree of condensation of the milk or otherwise. The spaces, $e$, may, if desired, be rendered adjustable in width or size by a gliding register or equivalent means to vary the thickness of the sheets of milk.

$a$ represents receptacles containing condensed milk to be treated and into which compressed air may be passed for forcing the material through conduits controlled by valves, $v$, into the upper compartment of the chamber, $c$, and from thence through the spaces, $e$, to form the condensed milk into sheets which hang in the lower compartment of the chamber, as aforesaid.

*i* represents outlets for the moisture laden air to escape by, leading to a main, *k*, which may be connected to a pump or extractor.

*l* represents arms on a shaft, *m*, for breaking up into small shreds or pieces, the dried sheets as they descend, and ejecting the particles through outlets controlled by valves, *n*, into any suitable containers for storing the product. If desired, receivers, *o*, may be provided. Each receiver, *o*, contains a hollow shaft, *s*, on which is mounted a drum, *p*, having an insulating coating of wood or the like, *q*, and provided with arms, *r*, for stirring up the particles of dried milk. Hot or cold air or the like may be passed through the drum, *p*, by means of the shaft to effect a heating or a cooling of the product. The receivers, *o*, may be connected to any suitable containers.

A plurality of receptacles and receivers, *a*, and *o*, have been shown to enable the working to be continuous.

It will be understood that in lieu of forming the milk into sheets by means of a grating, it might be formed into threads, or tubes, by any suitable means.

In carrying out the process by means of the apparatus described and shown, the condensed milk is forced preferably by aseptic air introduced into either receptacle, *a*, through one of the valves, *v*, into the upper compartment of the chamber, *c*, and thence through the slots, *e*, from the lower ends of which the condensed milk issues in sheet form as aforesaid. At the same time, hot preferably aseptic air is introduced through the main, *h*, into the bars, *f*, so as to issue from the slits or apertures, *g*, next or adjacent to the lower ends of the slots, *e*, in jets or streams parallel with and between each two adjacent condensed milk sheets. The air is thus introduced at the point where the condensed milk emerges from the grating in sheet form and acts evenly upon both sides of all the sheets in its hottest and driest condition while the sheets contain their largest amount of moisture. As the air passes downward and becomes cooled it only acts upon the already nearly dried sheets so that overheating of any sheet is prevented and uniform treatment is insured. The air is finally passed out by the outlets, *i*. The air has a direct passage between the sheets so that it may be admitted under a gentle pressure so as not to disturb or break up the sheets before they are dried. As the lower ends of the dried sheets come in contact with the arms, *m*, which are rotated at a suitable speed, the ends are knocked or broken off into shreds or small pieces or particles and are driven through the outlets and the valves, *n*, into any suitable receiver. As aforesaid, the dried product may pass into either of the receivers, *o*, to be stirred up by the arms, *r*, while being further heated or cooled.

As the whole process may be carried out protected from the atmosphere and under aseptic conditions, the dried product is most suitable for keeping.

Although the invention has only been described with reference to treating milk, I wish it to be understood that it is particularly suitable for and that the claims are intended to cover its use for treating mixtures of milk and cocoa, milk and coffee, and the like.

Having now described my invention, I claim as new and desire to secure by Letters Patent:—

1. The herein described method of producing dried food products, which consists in forming said products into elongated bodies, and directing currents of air against said bodies in the direction of their length.

2. The herein described method of producing dried food products, which consists in forming said food products into elongated sheets and simultaneously directing air currents at suitable temperatures against both lateral surfaces of said sheets.

3. The improved process of manufacturing dried milk from condensed milk consisting in forming the condensed milk into freely depending sheets, and directing currents of air at a suitable temperature from points adjacent to the point of formation of each sheet so that each sheet is dried by being heated on both sides by air moving in the same direction as the sheet, substantially as described.

4. The improved apparatus for manufacturing dried milk from condensed milk comprising, in combination, a septum provided with interstices, through which condensed milk is forced to form depending sheets, and means for directing currents of air at a suitable temperature from points adjacent to the issuing sheets in the same direction as their direction of movement substantially as described.

5. An apparatus for manufacturing dried food products, embodying therein a casing, an apertured transverse septum through which substances are adapted to pass in the form of sheets, and means adjacent said septum for directing air currents against both sides of said sheets as they issue from said septum.

6. An apparatus for manufacturing dried food products, embodying therein a casing, an apertured septum extending transversely across said casing, and means in said septum for directing air currents against substances passing through said septum.

7. An apparatus for manufacturing dried food products, embodying therein a casing, an apertured septum extending transversely across said casing, means for feeding substances to pass through said septum, and means in said septum for directing air currents against said substances as they issue from said septum.

8. An apparatus for manufacturing dried food products, embodying therein a casing, an apertured septum extending transversely across said casing, means for feeding substances through the apertures in said septum, means for directing air currents against said substances as they issue from said septum, and means for comminuting the aerated substances.

In testimony whereof, I have affixed my signature in the presence of two witnesses.

MAURICE VOUGA.

Witnesses:
F. L. COLOMB,
ED. FLAENSSLER.